H. J. RICKON.
AUTOMATIC AIR RELEASE.
APPLICATION FILED OCT. 12, 1918.

1,329,210.

Patented Jan. 27, 1920.
2 SHEETS—SHEET 1.

WITNESSES

INVENTOR
H. J. RICKON
BY
ATTORNEYS

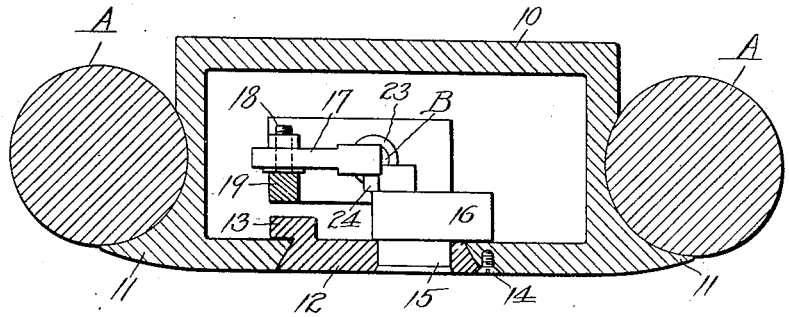
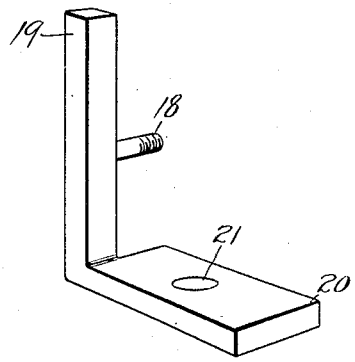
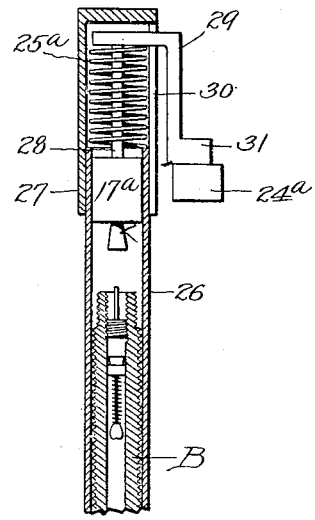
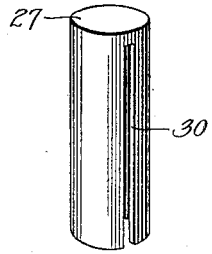

UNITED STATES PATENT OFFICE.

HAROLD J. RICKON, OF SAN FRANCISCO, CALIFORNIA, ASSIGNOR OF ONE-HALF TO JOHN A. SANDAL, OF SAN FRANCISCO, CALIFORNIA.

AUTOMATIC AIR-RELEASE.

1,329,210.  Specification of Letters Patent.  Patented Jan. 27, 1920.

Application filed October 12, 1918. Serial No. 257,842.

*To all whom it may concern:*

Be it known that I, HAROLD J. RICKON, a citizen of the United States, and a resident of San Francisco, in the county of San Francisco and State of California, have invented a new and Improved Automatic Air-Release, of which the following is a description.

My invention relates to an attachment to be applied to a wheel or wheels of an automobile or other vehicle, having pneumatic tires, said device including an element movable under centrifugal force to engage the valve for opening the latter and releasing the air from the tire to thereby constitute a theft indicator so that should the automobile be started by an unauthorized person, the turning of the wheel will cause the valve opening device to function and release the air to thereby produce a flat tire. The attachment includes means optionally movable to restrain the valve opening element as desired, so that the attachment may be set to automatically open the valve or held from functioning.

Reference is to be had to the accompanying drawings forming a part of this specification, it being understood that the drawings are merely illustrative of practical examples of the invention.

Fig. 3 is a transverse section;

Fig. 4 is a perspective view of the bracket for supporting the valve opening device;

Fig. 5 is a sectional elevation of a modified form of the attachment;

Fig. 6 is a perspective view of the cap employed with the device shown in Fig. 5.

Figure 1:
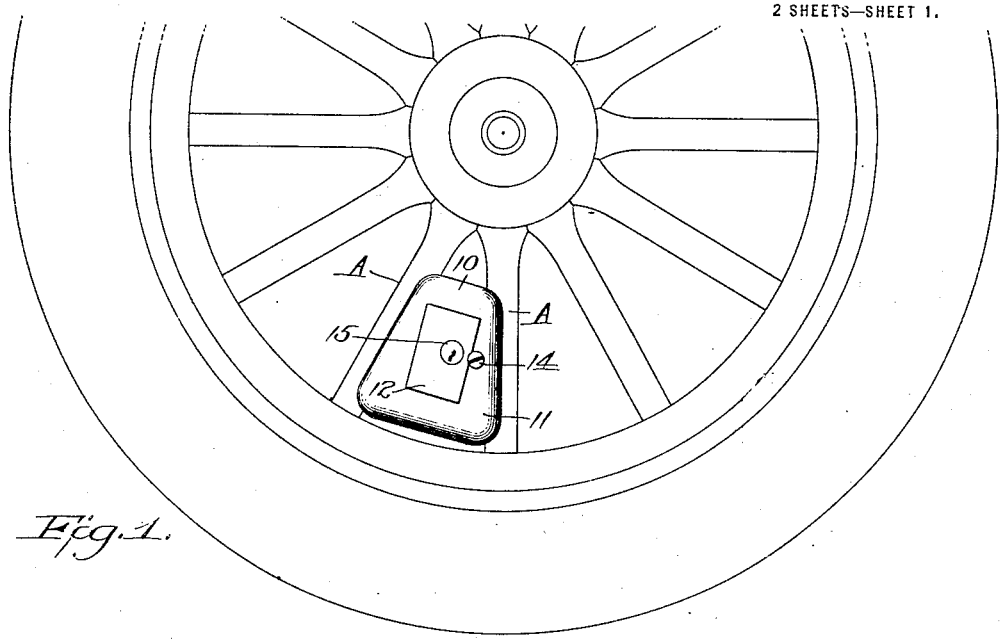
Figure 1 is a side view of a portion of an automobile wheel having my attachment applied thereto.

In carrying out my invention in accordance with the illustrated example, a casing 10 is provided of tapering form adapted to be wedged between adjacent spokes A of a wheel, the opposite sides of said casing having flanges 11 and otherwise formed to properly engage the spokes. A door 12 is provided in the face of the casing, said door having a flange 13 at the inside adapted to engage the casing at the interior at one side of the door opening. The sides of the door are beveled and the door openings correspondingly formed so that the door fits flush or approximately so with the casing. A set screw 14 in a tapped hole in the casing and adapted to overlie the door at the edge opposite the flange 13 may be employed if desired to guard against the accidental displacement of the door. A lock 15 of Yale-type is fitted in the door and has a lug 16 at one side which, with the turning of the lock bolt, engages the case 10 at the interior to positively lock the door.

Figure 2:
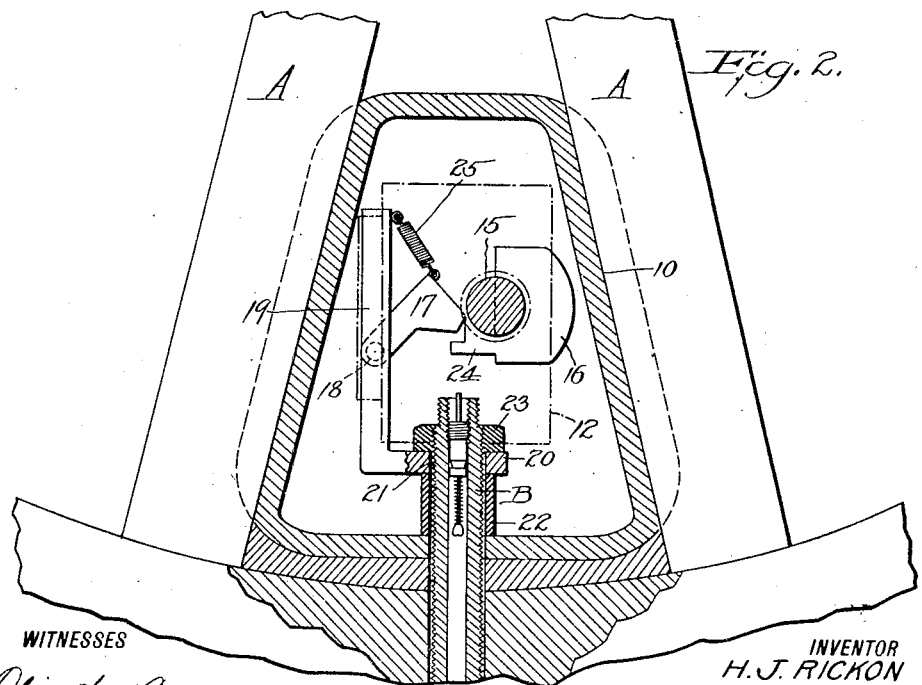
Fig. 2 is a sectional side view of said attachment and a portion of said wheel.

An element 17 is adapted to engage the stem of the tire valve B for opening the valve, said element 17 in the form shown in Figs. 1 to 4 being pivoted on a post or bracket 19, the foot 20 of which has a hole 21 to adapt the foot to slip onto the inner end of the tire valve B against a sleeve 22 thereon within the casing, said bracket being secured by a nut 23 or the like, such as the nut usually found on tire valves. By the described arrangement the element 17 will be positioned radially inward from the valve stem so that when said element is unrestrained the centrifugal force generated by the turning of the wheel will cause said element to act as a hammer to exert its pressure against the valve stem for opening the same.

In order to restrain the element 17 against movement toward the valve when the automobile is being operated by the owner or other authorized person, I provide on the lock bolt a second lateral lug 24 adapted to be turned into a position to project into the path of movement of said element 17 and prevent the latter from engaging the valve. A light spring 25 (Fig. 2) may be employed, connected with the element 17 and with the bracket 19, the spring having sufficient power to hold the said element 17 against engagement with the valve when the automobile is not being operated. Thus, the lock 15 may be manipulated to permit functioning of the element 17 when the owner leaves the automobile, whereby should the automobile be started by an unauthorized person, the air will be released from the tire.

In the form shown in Fig. 5 an element 17ª is adapted to slide in a tube 26 which may be applied outside of the valve B to extend beyond the latter, said tube having a cap 27 housing the stem 28 on the element 17ª and housing a light spring 25ª corresponding with the spring 25. The spring abuts at its outer end against a bracket 29 rigid with the stem 28 and extending through a slot 30 in the cap 27, said bracket having a foot 31 adapted to be engaged by a bolt or other member 24ª pertaining to the lock 15 and movable by the latter into or out of the path of movement of the foot 31. With the element 24ª moved to a position to permit movement of the foot 31, the element 17ª may move under centrifugal force due to the turning of the wheel and engage the stem of the valve B to open said valve to release the air.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

A device of the class described including a casing adapted to be secured to an automobile wheel adjacent to the tire valve, a door therefor, a lock for said door, means responsive to centrifugal force and disposed in said casing in position to engage the tire valve under centrifugal force due to the turning of the wheel for opening said valve, and means on the lock adapted, without unlocking the door, to be positioned by the lock to restrain said first means against operation.

HAROLD J. RICKON.